United States Patent

Tsubusaki

[11] Patent Number: 5,434,409
[45] Date of Patent: Jul. 18, 1995

[54] CRITICAL DIMENSION MEASURING METHOD

[75] Inventor: Koji Tsubusaki, Yokohama, Japan

[73] Assignee: Kabushiki Kaisha Toshiba, Kawasaki, Japan

[21] Appl. No.: 154,349

[22] Filed: Nov. 18, 1993

[30] Foreign Application Priority Data

Nov. 19, 1992 [JP] Japan .................................. 4-310111

[51] Int. Cl.⁶ .............................................. H01J 37/28
[52] U.S. Cl. ..................................... 250/307; 250/310
[58] Field of Search ................................ 250/307, 310

[56] References Cited

U.S. PATENT DOCUMENTS

| | | | |
|---|---|---|---|
| 4,567,364 | 1/1986 | Kano et al. | 250/310 |
| 4,588,890 | 5/1986 | Finnes | 250/307 |
| 4,766,311 | 8/1988 | Seiler et al. | 250/310 |
| 4,910,398 | 3/1990 | Komatsu et al. | 250/310 |
| 4,941,980 | 7/1990 | Halavee et al. | 250/307 |
| 5,051,585 | 9/1991 | Koshishiba et al. | 250/310 |
| 5,095,207 | 3/1992 | Tong | 250/307 |
| 5,159,643 | 10/1992 | Kaga | 250/307 |
| 5,302,829 | 4/1994 | Komatsu et al. | 250/307 |

Primary Examiner—Bruce C. Anderson
Attorney, Agent, or Firm—Oblon, Spivak, McClelland, Maier & Neustadt

[57] ABSTRACT

Line profile data obtained by scanning a circuit pattern with an electron beam is smoothing-differential so as to obtain a pair of approximate edge positions of the circuit pattern. Positions apart from the pair of approximate edge positions by a predetermined number of picture elements are referred to as start point and end point of automatic measuring algorithm. The automatic measuring algorithm is performed for the line profile data between the start point and the end point so as to detect precise edge positions of the circuit pattern.

8 Claims, 3 Drawing Sheets $$\begin{bmatrix}
\begin{array}{|c|c|c|} \hline 1 & 2 & 1 \\ \hline 0 & 0 & 0 \\ \hline -1 & -2 & -1 \\ \hline \end{array} &
\begin{array}{|c|c|c|} \hline 2 & 1 & 0 \\ \hline 1 & 0 & -1 \\ \hline 0 & -1 & -2 \\ \hline \end{array} &
\begin{array}{|c|c|c|} \hline 1 & 0 & -1 \\ \hline 2 & 0 & -2 \\ \hline 1 & 0 & -1 \\ \hline \end{array} \\
(a) & (b) & (c) \\[1em]
\begin{array}{|c|c|c|} \hline 0 & -1 & -2 \\ \hline 1 & 0 & -1 \\ \hline 2 & 1 & 0 \\ \hline \end{array} &
\begin{array}{|c|c|c|} \hline -1 & -2 & -1 \\ \hline 0 & 0 & 0 \\ \hline 1 & 2 & 1 \\ \hline \end{array} &
\begin{array}{|c|c|c|} \hline -2 & -1 & 0 \\ \hline -1 & 0 & 1 \\ \hline 0 & 1 & 2 \\ \hline \end{array} \\
(d) & (e) & (f) \\[1em]
\begin{array}{|c|c|c|} \hline -1 & 0 & 1 \\ \hline -2 & 0 & 2 \\ \hline -1 & 0 & 1 \\ \hline \end{array} &
\begin{array}{|c|c|c|} \hline 0 & 1 & 2 \\ \hline -1 & 0 & 1 \\ \hline -2 & -1 & 0 \\ \hline \end{array} & \\
(g) & (h) &
\end{bmatrix}$$

FIG. 7

CRITICAL DIMENSION MEASURING METHOD

BACKGROUND OF THE INVENTION

1. Field of the Invention

The present invention relates to a method for measuring the size of a circuit pattern formed on a substrate in an LSI fabrication process, in particular, to a circuit pattern size measuring method for accurately detecting edge positions of a circuit pattern.

2. Description of the Related Art

Conventionally, edge positions of circuit patterns formed on substrates in LSI fabrication process are detected by scanning electron microscopes (SEM). The SEM scans a circuit pattern with an electron beam so as to detect a circuit pattern. Thereafter, the operator manually sets parallel cursors on the circuit pattern obtained as a SEM image. An automatic measuring algorithm is executed for line profile data in the region surrounded by the parallel cursors so as to detect the edge positions of the circuit pattern.

Thus, to designate a measuring region of a circuit pattern for which the automatic measuring algorithm is executed, the operator should manually set the parallel cursors. However, the setting of the parallel cursors deviates depending on each operator. Therefore, the setting accuracy of the circuit pattern required for the automatic measuring algorithm cannot be always satisfied. In addition, available automatic measuring algorithms (such as threshold method, linear regression method, and maximum differential method) sometimes result in deviation of measured values or measurement error depending on parallel cursors being set. Moreover, the manual setting of parallel cursors lowers the operability and requires longer measurement time. The present invention is made to solve such problems.

SUMMARY OF THE INVENTION

An object of the present invention is to provide a critical dimension measuring method for accurately detecting edge positions of a circuit pattern without necessity of manual setting of parallel cursors.

The present invention is a circuit pattern size measuring method, comprising the steps of scanning a circuit pattern on a substrate with an electron beam so as to form image data, obtaining line profile data of the circuit pattern corresponding to measurement positions in accordance with the image data, smoothing-differentiating the line profile data so as to obtain a smoothing-differential wave form, calculating maximal values of the line profile data in accordance with the smoothing-differential wave form and obtaining measurement positions corresponding to two biggest points of each of the maximal values as a pair of approximate edge positions of the circuit pattern, obtaining a start point and an end point of an automatic measuring algorithm corresponding to the pair of approximate edge positions, and performing the automatic measuring algorithm for the line profile data ranging from the start point to the end point, for measuring a pair of accurate edge portions of the circuit pattern.

According to the present invention, the line profile data is smoothing-differentiated so as to obtain a pair of approximate edge positions of a circuit pattern. Corresponding to the pair of approximate edge positions, a start point and an end point are designated. With the start point and the end point, an automatic algorithm is executed. Thus, edge positions of a circuit pattern can be accurately detected.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 7a–h are schematic diagram showing arithmetic operations for Robinson operator process.

DESCRIPTION OF PREFERRED EMBODIMENT

Next, with reference to the accompanying drawings, an embodiment of the present invention will be described. FIGS. 1 to 7 show a critical dimension measuring method according to an embodiment of the present invention.

Figure 1:
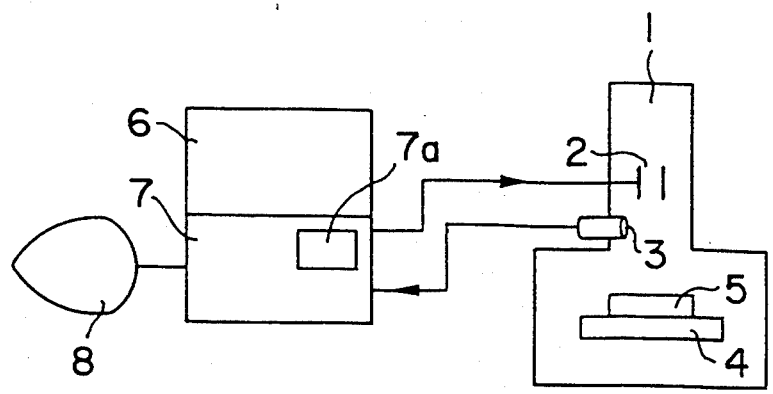
FIG. 1 is a schematic diagram showing an apparatus for accomplishing a critical dimension measuring method according to an embodiment of the present invention.
Figure 2:
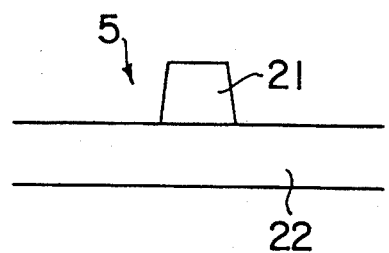
FIG. 2 is a sectional side view showing a sample where a circuit pattern is formed on a substrate.
Figure 3:
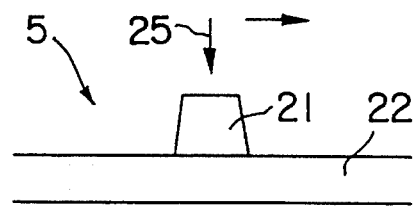
FIG. 3 is a sectional side view showing the sample where the circuit pattern on the substrate is scanned with an electron beam.

FIG. 1 shows an apparatus which accomplishes the circuit dimension measuring method according to the present invention. The apparatus includes a scanning electron microscope (SEM) 1 which comprises an X-Y stage 4 and a deflector 2. The X-Y stage 4 holds a sample 5. The deflector 2 deflects an electron beam 25 (see FIG. 3) so as to scan the sample 5 with the electron beam 25. As shown in FIG. 2, the sample 5 is composed of a substrate (such as a wafer) and a circuit pattern 21 formed thereon. A detector 3 is disposed above the X-Y stage 4. The detector 3 detects secondary electrons from the sample 5. The detector 3 is connected to an image processing device 7. The detector 3 outputs a secondary electron signal to the image processing device 7. The image processing device 7 outputs a deflection signal to the deflector 2. The image processing device 7 is connected to a computer 6 and a monitor 8.

Next, the operation of this embodiment will be described. The image processing device 7 outputs the deflection signal to the deflector 2 of the SEM 1. The deflector 2 scans the circuit pattern 21 formed on the substrate 22 with the electron beam 25 (see FIG. 3). At this point, the detector 3 of the SEM 1 detects secondary electrons from the sample 5. The detector 3 outputs the secondary electron signal to the image processing device 7 in synchronization with the deflection signal. The image processing device 7 converts the secondary electron signal, which is an analog signal, into a digital signal. The digital data which has graduation of 256 levels is stored in a frame memory 7a. In this embodiment, the scanning operation with the electron beam 25 may be performed several times so as to reduce noise. The obtained image data may be averaged and then stored in the frame memory 7a.

The computer 6 reads the image data from the frame memory 7a and performs arithmetic operations for measuring the size of a circuit pattern. These arithmetic operations will be described later. In addition, a circuit pattern corresponding to the image data stored in the frame memory 7a of the image processing device 7 is displayed on a monitor 8.

Figure 4:
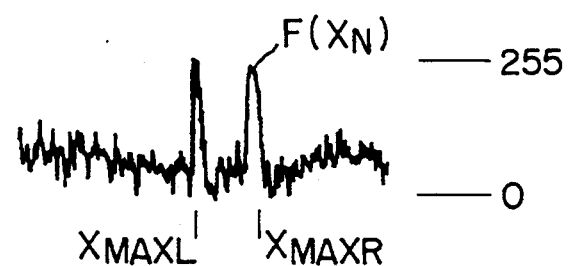
FIG. 4 is a graph showing normalized line profile data.

Next, the arithmetic operations for measuring the size of a circuit pattern performed by the computer 6 will be described. First, image data is read from the frame memory 7a. The computer 6 calculates line profile data corresponding to measuring positions in beam scanning direction (x direction). Then, the computer 6 calculates the maximum value and the minimum value of the line profile data and then normalizes the line profile data. The normalizing operation is performed in such a way that the line profile data is linearly emphasized so that the minimum value and the maximum value become 0 and 255, respectively. FIG. 4 shows normalized profile data $F(X_N)$.

Next, the normalized line profile data $F(X_N)$ is smooth-differentiated so as to detect the edges of the circuit pattern 21. The smoothing-differential method is a process which convolutes standardized line profile data $F(X_N)$ with weighting coefficients for the smooth-differentiation (e.g., $-3, -2, -1, 0, 1, 2, 3$ in the case of seven-point smoothing of the first-order differentiation) so as to obtain a smoothing-differential wave form.

Figure 5:
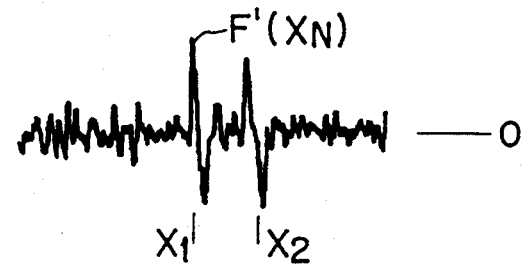
FIG. 5 is a graph showing a wave form where line profile data has been smooth-differentiated.

Thus, the normalized line profile data $F(X_N)$ is convoluted with the smoothing-differential weighting coefficients so as to obtain a smoothing-differential wave form $F'(X_N)$ (see FIG. 5).

Next, measurement positions $X_K$ where the smoothing-differential wave form $F'(X_N)$ changes from positive to negative are obtained. $X_K$ are equivalent to measurement positions where the line profile data $F(X_N)$ has maximal values. To detect two peaks according to the edges of the circuit pattern 21, measurement positions $X_1$ and $X_2$ of $X_K$ where $F(X_K) > A$ are obtained. In other words, $X_1$ and $X_2$ are the measurement positions corresponding to two biggest points of the maximal values. Next, the value of $X_1$ is compared with the value of $X_2$. The smaller value is referred to as an approximate left edge position $X_{MAXL}$, whereas the larger value is referred to as an approximate right edge position $X_{MAXR}$.

Figure 6:
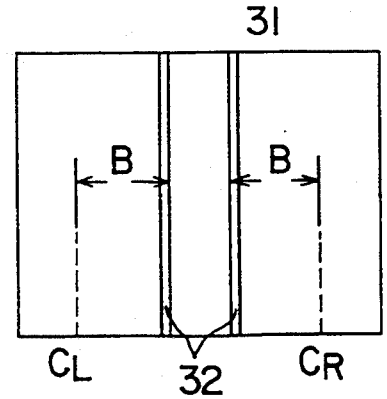
FIG. 6 is a schematic diagram showing a start point and an end point of an automatic measuring algorithm.

In addition, the number of predetermined picture elements is referred to as B. The position where the approximate left edge position $X_{MAXL}$ is moved leftward (outward) by B, $(X_{MAXL} - B)$, is referred to as a left parallel cursor position $C_L$ (start point), whereas the position where the approximate right edge position $X_{MAXR}$ is moved rightward (inward) by B, $(X_{MAXR} + B)$, is referred to as a right parallel cursor position $C_R$ (end point). The parallel cursor positions $C_L$ and $C_R$ are used for the automatic measuring algorithm which will be described later. In FIG. 6, the approximate edge positions $X_{MAXL}$ and $X_{MAXR}$ accord with slope portions 32 of the circuit pattern 31 of the image data.

Thus, with the automatic measuring algorithm, the start point and the end point of the line profile data $F(X_N)$ to be measured are automatically specified. Next, for the region from the start point $C_L$ to the end point $C_R$ of the line profile data $F(X_N)$, the automatic measuring algorithm is performed. Examples of the automatic measuring algorithm are threshold method, liner regression method, and maximum differential method.

By the automatic measuring algorithm, the edge positions of the circuit pattern 21 can be precisely obtained.

According to this embodiment, the line profile data is smooth-differentiated so as to obtain the approximate edge positions $X_{MAXL}$ and $X_{MAXR}$. Corresponding to these approximate edge positions, the left and right parallel cursor positions $C_L$ and $C_R$ are set. Thus, the parallel cursors can be more accurately set than the conventional method where they are manually set. Thus, by the automatic measuring algorithm, the edge positions of a circuit pattern can be accurately detected.

In the above-described embodiment, the image data with gradation of 256 levels was stored in the frame memory 7a. However, it should be noted that the present invention is not limited to such gradation. Instead, image data with gradation of 4096 may be stored in the frame memory 7a.

In the above-described embodiment, the line profile data in the X direction was obtained. However, before obtaining the line profile data, Robinson operator process as shown in FIG. 7 may be performed so as to obtain line profile data in any desired direction.

For example, if the Robinson operator processing shown in FIG. 7(a) is performed, one edge of the circuit pattern which runs in parallel to the a X direction of the image data stored in the frame memory 7a is emphasized. In addition, by the Robinson operator processing shown in FIG. 7(b), one edge of the circuit pattern which runs diagonally from the upper right to the lower left is emphasized. By the Robinson operator processing shown in FIG. 7(c), one edge of the circuit pattern which runs vertically is emphasized. By the Robinson operator processing shown in FIG. 7(d), one edge of the circuit pattern which runs from the upper left to the lower right is emphasized.

By the Robinson operator processing shown in FIG. 7(e), the other edge of the circuit pattern in a same direction as FIG. 7(a) is emphasized. By the Robinson operation process shown in FIG. 7(f), the other edge of the circuit pattern in a same direction as FIG. 7(b) is emphasized. By the Robinson operator processing shown in FIG. 7(g), the other edge of the circuit pattern in a same direction as FIG. 7(c) is emphasized. By the Robinson operator processing shown in FIG. 7(h), the other end of the circuit pattern in a same direction as FIG. 7(d) is emphasized.

By successively performing the Robinson operator process in the above-described manners, image data which is emphasized in each direction is compared. Thus, the direction of the circuit pattern is detected. Corresponding to the detected direction, the line profile data can be obtained.

According to the present invention, the start point and the end point of the automatic algorithm can be specified corresponding to the pair of approximate edge positions obtained by smoothing and differentiation of the line profile data. Thus, the edge positions of the circuit pattern can be more accurately detected than the conventional method where parallel cursors are manually set.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A critical dimension size measuring method comprising the steps of:
   (a) scanning a circuit pattern on a substrate with an electron beam so as to form image data;
   (b) obtaining line profile data of the circuit pattern corresponding to measurement positions in accordance with said image data;
   (c) smooth-differentiating said line profile data so as to obtain a smoothing differential waveform;
   (d) calculating maximal values of the line profile data in accordance with the smoothing differential waveform and obtaining measurement positions corresponding to the maximal values as a pair of approximate edge positions of the circuit pattern;
   (e) obtaining a start point and an end point of an automatic measuring algorithm corresponding to the pair of approximate edge positions; and
   (f) performing the automatic measuring algorithm for the line profile data ranging from the start point to the end point, for measuring a pair of actual edge positions of the circuit pattern.

2. The critical dimension size measuring method as set forth in claim 1,
   wherein said step (b) is performed by averaging image data obtained by scanning the circuit pattern with the electron beam a plurality of times.

3. The critical dimension size measuring method as set forth in claim 1, further comprising the steps of:
   (b-1) detecting a maximum value of and a minimum value of the line profile data; and
   (b-2) linearly emphasizing the line profile data in accordance with the maximum value and the minimum value so as to standardize the line profile data.

4. The critical dimension size measuring method as set forth in claim 1,
   wherein said step (e) is performed by designating a position spaced apart leftward from an approximate left edge position by a predetermined number of picture elements as a start point and a position spaced apart rightward from an approximate right edge position by a predetermined number of picture elements as an end point.

5. A critical dimension size measuring method, comprising the steps of:
   (a) scanning a circuit pattern on a substrate with an electron beam so as to form image data;
   (b) obtaining line profile data of the circuit pattern corresponding to measurement positions in accordance with said image data;
   (c) smooth-differentiating the line profile data so as to obtain a smoothing differential waveform;
   (d) calculating maximal values of the line profile data in accordance with the smoothing differential waveform and obtaining measurement positions correspond to the maximal values as a pair of approximate edge positions of the circuit pattern;
   (e) obtaining a start point and an end point of an automatic measuring algorithm corresponding to the pair of approximate edge positions; and
   (f) performing the automatic measuring algorithm for the line profile data ranging from the start point to the end point, for measuring a pair of actual edge positions of the circuit pattern,
   wherein said step (b) is performed by executing a Robinson operator process for the image data, said Robinson operator process for the image data, said Robinson operator process being adapted to emphasize the approximate edge positions of the circuit pattern in a desirable direction.

6. The critical dimension size measuring method as set forth in claim 5,
   wherein said step (b) is performed by averaging image data obtained by scanning the circuit pattern with the electron beam a plurality of times.

7. The critical dimension size measuring method as set forth in claim 5, further comprising the steps of:
   (b-1) detecting a maximum value and a minimum value of the line profile data; and
   (b-2) linearly emphasizing the line profile data in accordance with the maximum value and the minimum value so as to standardize the line profile data.

8. The critical dimension size measuring method as set forth in claim 5,
   wherein said step (e) is performed by designating a position spaced apart leftward from an approximate left edge position by a predetermined number of picture elements as a start point and a position spaced apart rightward from an approximate right edge position by a predetermined number of picture elements as an end point.

* * * * *